(12) United States Patent
Maxymych

(10) Patent No.: US 6,850,767 B1
(45) Date of Patent: Feb. 1, 2005

(54) TRANSACTION TRAY WITH COMMUNICATIONS MEANS

(76) Inventor: Peter Nicholas Maxymych, 4700 St. Catherine St. West, Westmount, Quebec (CA), H3Z 1S6

( * ) Notice: Subject to any disclaimer, the term of this patent is extended or adjusted under 35 U.S.C. 154(b) by 0 days.

(21) Appl. No.: 09/548,615

(22) Filed: Apr. 13, 2000

(51) Int. Cl.[7] .............................................. H04Q 7/20
(52) U.S. Cl. ..................... 455/461; 455/426.1; 455/424; 455/575.1; 455/90.3; 455/566; 362/154; 362/84; 362/98; 362/234; 362/253; 705/39; 705/42
(58) Field of Search ...................... 455/566, 90, 575.1, 455/461, 426, 426.1, 424, 90.3; 705/35, 39, 42; 379/93.12, 93.01

(56) References Cited

U.S. PATENT DOCUMENTS

| | | | | |
|---|---|---|---|---|
| 4,005,388 A | * | 1/1977 | Morley et al. | 341/23 |
| 4,115,870 A | * | 9/1978 | Lowell | 345/169 |
| 4,415,065 A | * | 11/1983 | Sandstedt | 186/39 |
| 4,530,067 A | * | 7/1985 | Dorr | 705/15 |
| 5,813,748 A | * | 9/1998 | Maxymych | 362/154 |
| 5,893,076 A | * | 4/1999 | Hafner et al. | 705/28 |
| 5,903,830 A | * | 5/1999 | Joao et al. | 455/406 |
| 5,933,812 A | * | 8/1999 | Meyer et al. | 235/380 |
| 5,991,740 A | * | 11/1999 | Messer | 705/27 |
| 6,024,288 A | * | 2/2000 | Gottlich et al. | 235/380 |
| 6,141,006 A | * | 10/2000 | Knowlton et al. | 345/835 |
| 6,710,895 B1 | * | 3/2004 | Gatto et al. | 358/1.6 |

* cited by examiner

*Primary Examiner*—Marceau Milord
(74) *Attorney, Agent, or Firm*—Bourque & Associates

(57) ABSTRACT

A transaction tray comprises a surface having a first writing portion, a display screen and communications means for receiving information to be displayed on the display screen, wherein the information which is received by the communications means is received from a source remote from said apparatus. The communications means may be a wireless communications means, a two-way communications means or a hard wired communications means. Further, a transaction tray comprises a tray portion and a hinged lid portion, lighting means associated with the tray portion, a first transparent window is provided in the outer surface of the lid and a second transparent window in the inner surface. A first translucent advertising substrate is displayed in the first window and a second translucent advertising substrate is displayed in the second window. Communications means is provided to receive information to be displayed on the first and second translucent advertising substrates, wherein said information is received by said communications means from a source remote from said transaction tray.

33 Claims, 8 Drawing Sheets

TRANSACTION TRAY WITH COMMUNICATIONS MEANS

BACKGROUND OF THE INVENTION

1. Field of the Invention

The present invention relates to a transaction tray with communications means, and more particularly, to a transaction tray that has the capability of receiving advertising, messages, voice mail and other media, or information in addition to the primary use of the tray, that is, supporting a credit card for review and signature of the credit card slip as well as point of sale transactions. In addition, the present invention relates to a transaction tray with two-way communications means, wherein the customer may receive advertising, information, messages, voice and data and other media, and may also respond to choices, i.e. order products and services, respond to questions, surveys etc, or perform online betting, online browsing, net-surfing etc. . . . and in any other way perform or effect internet transactions, including credit card, bank card or other transaction directly from the transaction tray.

2. Description of the Prior Art

Tip or transaction trays are quite common in restaurants and bars and other such types of establishments. The waiter or waitress usually delivers the check to the customer directly at the table for the customer's review. The customer leaves cash or a credit card in the tip tray. The waiter then collects the tip tray, brings it to the cashier to complete the transaction or to process the credit card, and then returns the tray to the customer. The customer reviews the transaction sheet, leaves a tip, or signs the credit card transaction slip. The customer may therefore have had access to the tray at least twice. At times, the restaurant or bar may be poorly lit, and it sometimes requires supplemental lighting, such as a flashlight carried by the waiter, to properly read the transaction sheet on the tray.

There is technology available to allow for electronic point of sale transactions, that is, where a credit or bank card can be processed directly from a transaction tray. Further, technology exists which may allow for ordering food directly at one's table, for example, portable transaction terminal apparatus as disclosed in U.S. Pat. No. 5,933,812 to Lee Meyer et. al. U.S. Pat. No. 5,845,263 to Camalsa et al. U.S. Pat. No. 4,569,421 to Sandstedt. However, there is at present no. technology which would allow the user of a transaction tray i.e. a restaurant or bar customer, to have access to a remote communication and information source, such as the internet, directly through his tray at his table.

It would therefore be advantageous to provide for a tray, i.e. a transaction tray which is equipped with communications means, i.e. telephony and/or wireless communications means.

It would therefore be advantageous to provide for a tray, i.e. a transaction tray which is equipped with communications means, i.e. wireless communications means for the downloading and/or receiving of information and which is further equipped with a display screen which may display messages, advertising, etc. or in any other manner allow for displaying (i.e. visually displaying) of information from a remote source.

It would also be advantageous to provide for a tray, i.e. a transaction tray which is equipped with wireless communications means, i.e. two two-way wireless communications means and which is further equipped with a display screen which may display messages, advertising, or in any other manner allow for the downloading and/or receiving of information from a remote source and which may allow the user of the tray to, not only receive information, but also forward or transmit information to a remote source.

It would further be advantageous to provide a transaction tray which may have a keyboard to allow a user to identify or select choices, which are then transmitted to a remote source.

It would be advantageous to provide a transaction tray which would allow for a patron at a bar, restaurant, or other such establishment, to be connected to the internet, either through wireless means, or by being wired, such that while paying his bill, the patron can effect internet transactions.

SUMMARY OF THE INVENTION

In accordance with a general aspect of the present invention, there may be provided for an:
  apparatus comprising:
    a surface,
      a display screen,
        said surface comprising a first writing portion configured to allow a user to write thereon,
        said display screen being configured to display information thereon
    said apparatus further comprising communications means for receiving information to be displayed on said display screen,
      wherein said information is received from a source remote from said apparatus.

In accordance with a further aspect of the present invention, there may be provided for an
  apparatus comprising a surface,
    a display screen,
    a keypad,
    said surface comprising a first writing portion configured to permit writing thereon,
    the display screen being configured to display information thereon,
      said keypad comprising at least two keys to allow an operator of the apparatus to respond to the information displayed on the display screen, and
    a communications means to allow for receiving and sending information to a remote source.

In accordance with a general aspect, the tray of the present invention may be provided with a surface which may be sized and configured to allow for a customer to write thereon, for example, to allow the customer to pay his bill by signing his credit card slip. Further, the transaction tray may comprise a display screen, for example a small or very small display screen which may be adapted to display thereon information, news, web sites, etc. . . . and which may, for example, allow the customer, while he waits for service from the restaurant staff, to read information, follow the news, follow stocks, gamble, make online purchases, or simply receive e-mails, other types of messages such as advertising, music, television programs, etc. . . . In accordance with a particular aspect, the tray may comprise speakers, or other sound generating equipment to allow the tray to emit or broadcast music.

In order to allow for the tray to receive this information, it may be provided with communications means. For example, the communications means may be a wireless communications means, wherein information or data which is sent, i.e. transmitted, uploaded, etc. from a remote transmitter may be captured, i.e. received, downloaded, by the communications means of the tray and appropriately converted and converted to be displayed on the screen. The communications means may utilize any known communication technology. In accordance with a particular embodiment, the communications means may utilize telephony, i.e. telephone technology, whether cellular phone technology, i.e. analog or digital, or any other type of phone technology. Alternatively, the communications means may be non wireless, i.e. it may, for example, be through telephone lines, or cable lines which may be provided at the table or at other locations where the customer is eating, and which may be plugged into the tray at a specially designed port on the tray.

In accordance with a further aspect, the tray of the present invention may also allow for two-way communication, i.e. two-way wireless communication or two-way wired communication. Thus, in accordance with this aspect, the tray may not only receive information but may also forward, i.e. transmit, information. In accordance with this aspect, the tray may therefore comprise a keyboard comprising, in its most simple form, one or more keypads, for example a 'YES' keypad and a 'NO' keypad to allow the customer the simplest communication possible. In a further embodiment, the tray may comprise a more complete keypad having greater number of alpha numeric functions, or may even comprise a typewriter type keypad, having 26 letters, 10 numerals and other functions. In addition, the tray may comprise a mouse, a traction ball, a joystick, a touchpad, touchscreen or any other means for allowing the user to reply, make his choices known, or transmit information.

A particular embodiment in accordance with the present invention may comprise a transaction tray having a tray portion and a hinged lid portion, the tray portion having a transaction compartment and a storage compartment, lighting means associated with the transaction compartment, the lid portion having a flat outer surface and a parallel inner surface, a first transparent window in the outer surface of the lid and a second transparent window in the inner surface, a first translucent intelligence bearing substrate displayed in the first window and a second translucent intelligence bearing substrate in the second window, and a lighting means between the first and second translucent substrates, whereby the transaction tray will be lit by the lighting means and the translucent substrates will be displayed and backlit from both sides of the hinged lid. In addition, the transaction tray may also be fitted or comprise communications means in order to allow the user of the transaction tray to receive information from an off site or remote transmitter of information. Further, this particular embodiment may comprise a two-way communications means to allow both the reception and transmittal of information. Thus, this embodiment would allow for the reception of information which would be displayed on the intelligence bearing substrates.

An advantage of the transaction tray in accordance with an aspect of the present invention is that a compact tray, having a lid for confidentiality of the transaction, is provided, wherein the tray is properly illuminated for the customer, and information, such as advertising messages, can be received from a remote location and illuminated and displayed on the tray.

It is also contemplated that the tray can be converted to a point of sale transaction instrument without significantly changing the nature of the invention. Thus, in accordance with this additional aspect, a tray as described above, i.e. comprising communications means allowing the user internet or other type of communications, i.e. telephony communications, may also be equipped to allow for point of sale transactions, such as the execution of credit card payments for meals, or other.

In accordance with an aspect of the present invention, the communications means itself which would enable the user of the transaction tray to communicate with a remote site may be licensed from known manufacturers of telecommunications equipment. The communications means, i.e. the communications equipment, may be wireless, one or two two-way equipment, or may also be wired equipment, and may be purchased under license from, for example, Qualcom, Nokia, Erickson, 3com or other makers of communications equipment. The communications means may be incorporated into the tray, or, in accordance with a further embodiment, may comprise stand alone equipment which may be connected to a tray, or may be disposed adjacent the tray, such as for example, on a table, bar counter, etc. . . .

In accordance with an aspect of the present invention, the communications means may utilize any known communication technology, or any communication of technology, either known or which is still to be developed or perfected. For example, the technology may utilize radio frequency, radar, infrared, or any other frequency which may be utilized to transmit and/or receive information. In addition to the above, the present invention may incorporate encryption or other safety technology to enable the communications, and therefore any internet transactions which may be effected via the tray, to be secure.

Further, the technology associated, for example, with the screen, i.e. the small screen, the joystick, traction ball, touchpad, touchscreen and any other technology necessary for the downloading of information, transforming said information to a visual or audible format, and any technology for allowing the user of the tray to communicate his choices and/or wishes and/or information may be purchased of licensed from manufacturers of known technology, and incorporated into the present transaction tray with communications means in order to effect the objectives of the present invention.

It is understood that the expression 'display screen' may encompass any known type of screen, such as a TV screen, computer screen or monitor or any other suitable substrate or surface which is adapted to display information. Further, the word information may comprise and is generally understood to mean data, in any format, as is generally in the information technology field.

DESCRIPTION OF THE PREFERRED EMBODIMENTS

Having thus generally described the nature of the invention, reference will now be made to the accompanying drawings, showing by way of illustration, a number of embodiments thereof, and in which.

Figure 1:
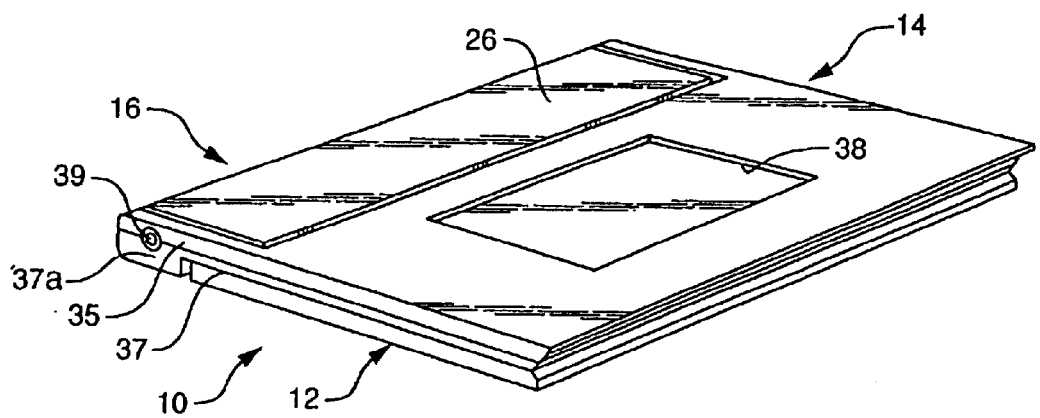
FIG. 1 is a perspective view of an embodiment of a transaction tray in a closed position in acccordance with an aspect of the present invention.

The embodiment shown in these drawings 1 to 5 illustrates an example embodiment of a transaction tray used by waiters in restaurants and bars. The transaction tray 10 includes a tray 12 and may include a hinged lid 14. The rear of the tray 12 includes a battery and circuit compartment 16. Further, the rear of the tray 12 may also comprise the communications means 15, i.e. the one-way or two-way communications means 15 which may allow for the receiving and/or a transmitting of information from and to a remote transmitter/receiver source which remote transmitter/receiver source may then be connected to a communications network, i.e. the internet.

Figure 2:
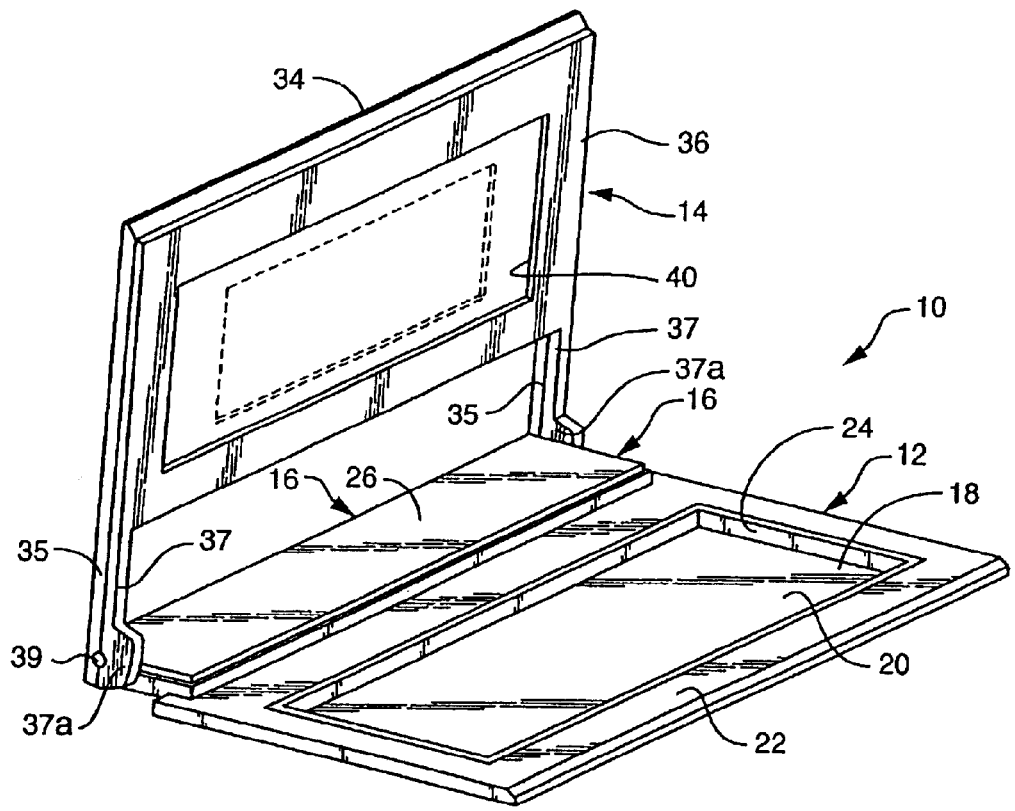
FIG. 2 is a perspective view of the embodiment shown in FIG. 1 but in an open position.
Figure 3:
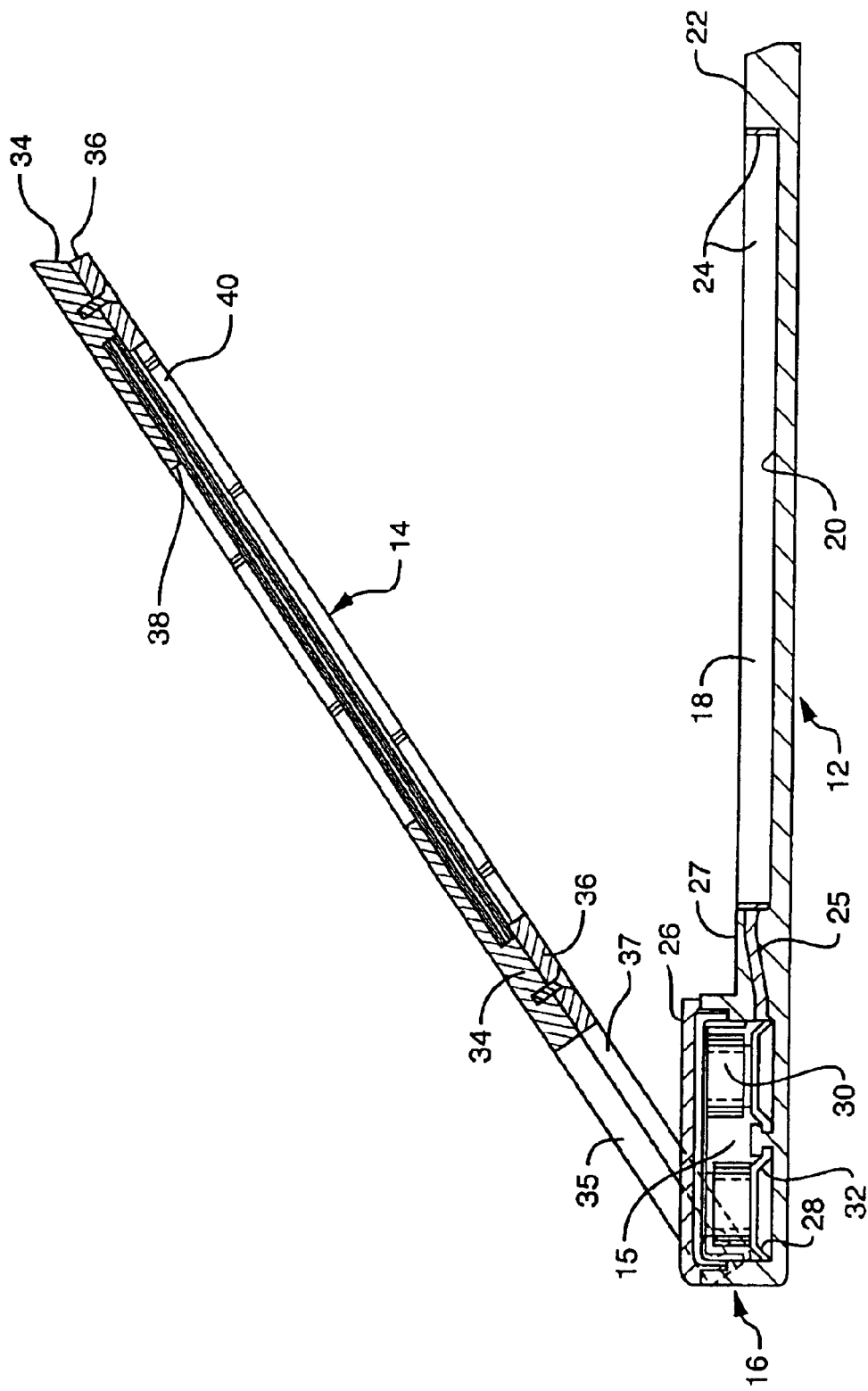
FIG. 3 is a vertical cross-section extending laterally of the transaction tray of FIG. 2 in an open position.
Figure 4:
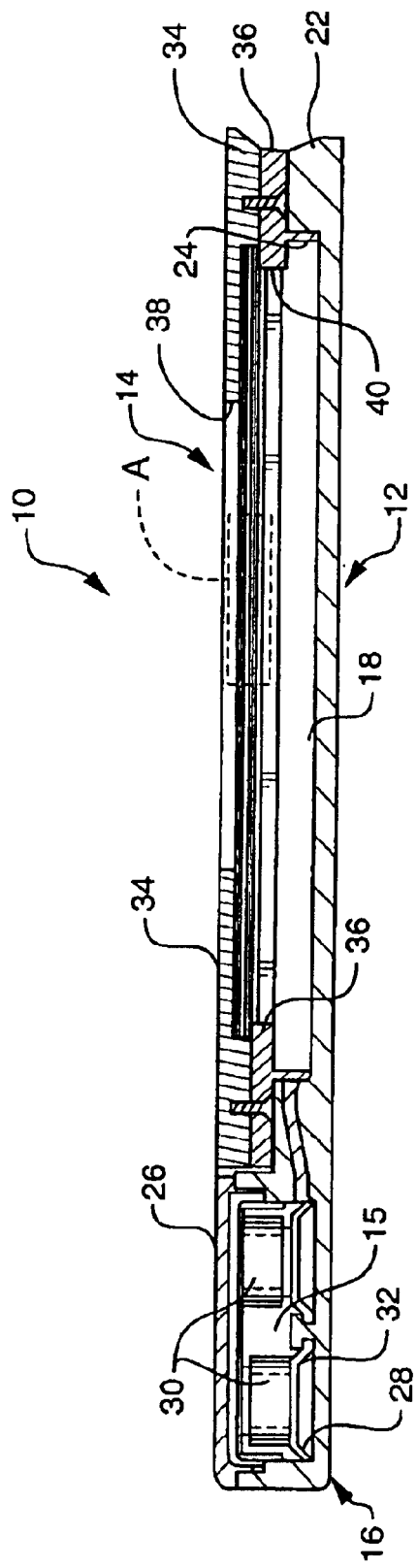
FIG. 4 is a vertical cross-section, similar to FIG. 3, showing the transaction tray in a closed position.

The tray 12 includes a recessed portion 18 surrounded by a raised periphery 22. The recessed portion includes a bottom surface 20, and an illumination strip 24 surrounds the bottom surface 20, as shown in FIG. 2, for instance.

The illumination strip 24 is an electro luminescent flexible strip that is a laminate including phosphorescent substance and is available from Max-Sun Technologies Inc., of Montreal, Quebec, Canada. Positive and negative leads can be connected at any point to the strip 24 and, with sufficient current, the strip will be illuminated in order to illuminate the recessed area 18. The illumination strip 24 is connected by way of leads 25 and 27 to a suitable circuit in the compartment 16. The compartment 16 includes a recess 28 in which batteries 30 are connected to terminals 32. The circuit might include an on/off switch S to shut the current to the illumination strip 24 when the lid 14 is closed onto the tray 12. The recess 28 is closed by a removable lid 26, closing off the compartment 16.

The lid 14 includes a pair of panels 34 and 36 which are fastened together. Panel 34 has a pair of leg extensions 35 while panel 36 has leg extensions 37. The end of leg extensions 37 includes an enlarged portion 37a and defines with the leg portion 35 an opening to be journaled on the pivot pin 39. Thus, legs 35 and 37, provided at each end of the lid 14, provide for the lid 14 to pivot.

Figure 5:
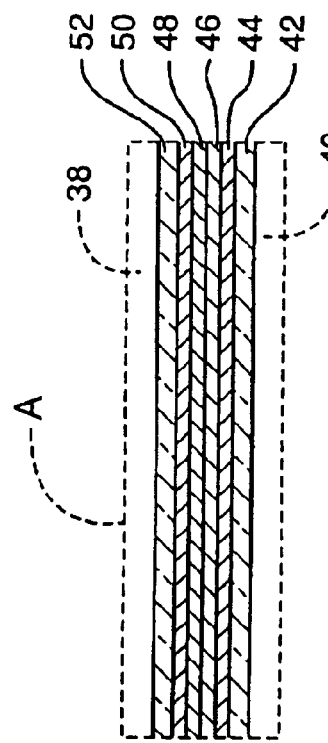
FIG. 5 is an enlarged fragmentary cross-section of the area identified A in FIG. 4.

The panel 34 defines an upper window 38 while the panel 36 defines a lower window 40. Sandwiched between the panels 34 and 36 and exposed to the windows 38 and 40 are a plurality of layers as will be described in reference to FIG. 5. From the bottom window 40 and in ascending order, there is a transparent film 42 and a then translucent intelligence bearing layer 44. An advertising message could be displayed on this translucent layer 44. Independent illumination strips 46 and 48 are next. These illumination strips are cut to a length and width which corresponds to the length and width of the layers 42 through 52. Above the pair of illuminating strips 46 and 48, there is another translucent layer 50 which might represent a different advertising message to be displayed and viewed from the exterior of the tray 10, particularly when the lid is closed onto the tray. Finally, a transparent film 52 completes and window 38 from the top. As may be understood, the communications means 15 may receive messages, information, advertising, etc. from a remote source, and may display said information on the translucent intelligence bearing layers 44 and 50. As may be understood, each of the translucent intelligence bearing layers 44 and 50 may display a different message or the same message.

Accordingly, illuminated advertising or other message can be seen from the upper window 38 when the transaction tray 10 is closed. When the transaction tray is open, such as in FIG. 2, an advertising message 44 is displayed through window 40 and is lit from behind by means of illumination strip 46. The illumination strip 46 and illumination strip 48 are connected to the operating electrical circuit in a similar manner to illumination strip 24. The leads (not shown) could pass through the hinge arms 35 and 37 to the compartment 16. The intelligence bearing layers 44 and 50 may be connected in any known manner to the communications means 15, and may be connected through the hinge arms 35 and 37 to the compartment 16.

The transaction tray 10 has been described as a typical server tray for handling cash or credit cards, that is, in the same manner as a conventional tip tray. However, it is contemplated that a similar transaction tray, in accordance with the present invention, could be provided with point of purchase capabilities using presently known technology, such as a credit card reader and even a printer in place of the recess 18.

Figure 6:
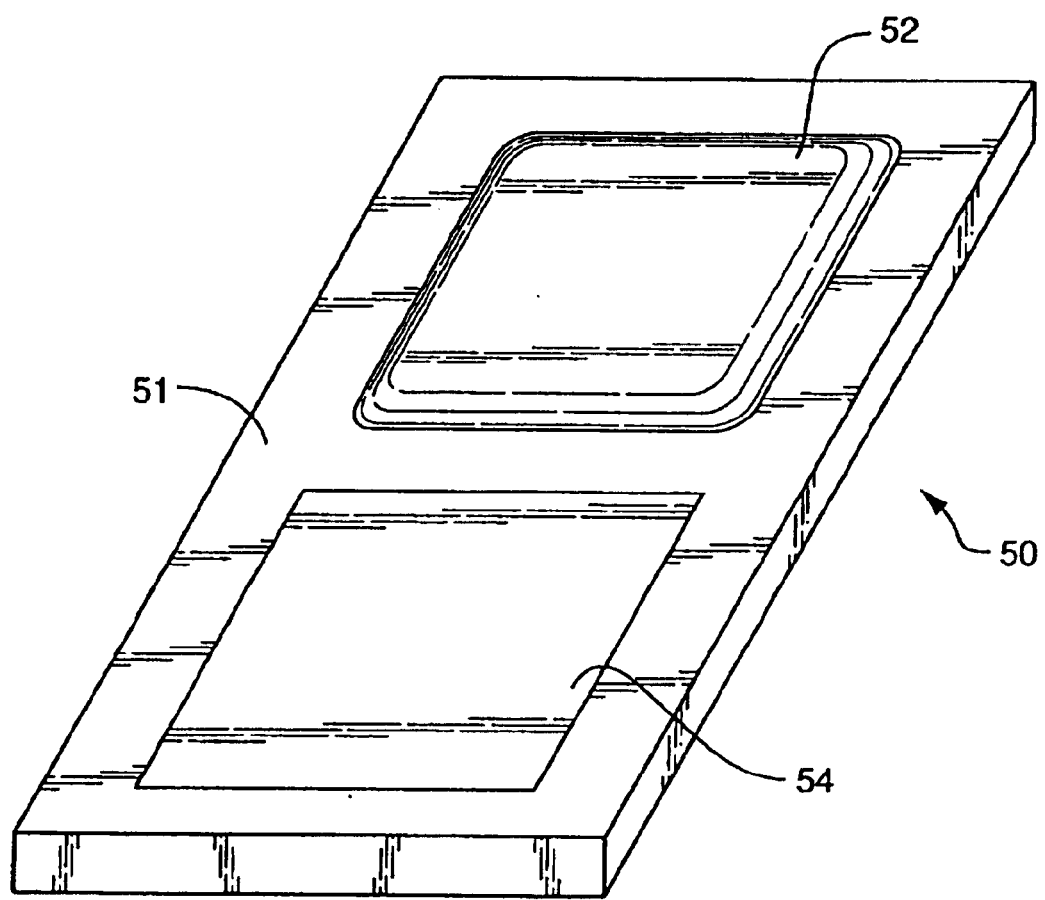
FIG. 6 is a perspective view of an alternative embodiment of a transaction tray in accordance with a further aspect of the present invention.

FIG. 6 illustrates a further embodiment of a transaction tray in accordance with a further aspect of the present invention. The transaction tray 50 includes a surface 51 and a display screen 52. Surface 51 may be configured and disposed to be of any required shape, for example as illustrated in FIG. 6, surface 51 is arranged in the shape of a rectangle. Surface 51 further comprises a first writing portion 54 sized and configured to allow the user to write thereon. As may be understood, a user (not shown) which is handed a transaction tray for the settling of his bill, may use the first writing portion 54 as a surface or substrate on which the credit card slip may be verified, added up, and signed. As may be further understood, first writing portion 54 may also comprise a non-slip surface affixed thereon (not shown) or may be configured such that its surface comprises grooves and other shapes to prevent the slipping of paper when written thereon. In addition, surface 51 and/or first writing portion 54 may comprise a clip or other paper retaining device, which may assist in the holding in place of the credit card slip, or which may prevent the credit card slip from flying off when the transaction tray is displaced.

As illlustrated in FIG. 6, display screen 52 may be configured and disposed adjacent the first writing portion 54 and may, in accordance with the particular embodiment illustrated, be disposed above the first writing portion 54. It is understood, however, that the configuration and relative position of the display screen 52 and first writing portion 54 may be different than illustrated in FIG. 6, and may, for example, be side by side or otherwise. As illustrated, display screen 52 is shown to occupy close to fifty percent (50%) of surface 51 but it is understood that display screen 52 may be either larger or smaller than illustrated in FIG. 6.

Figure 7:
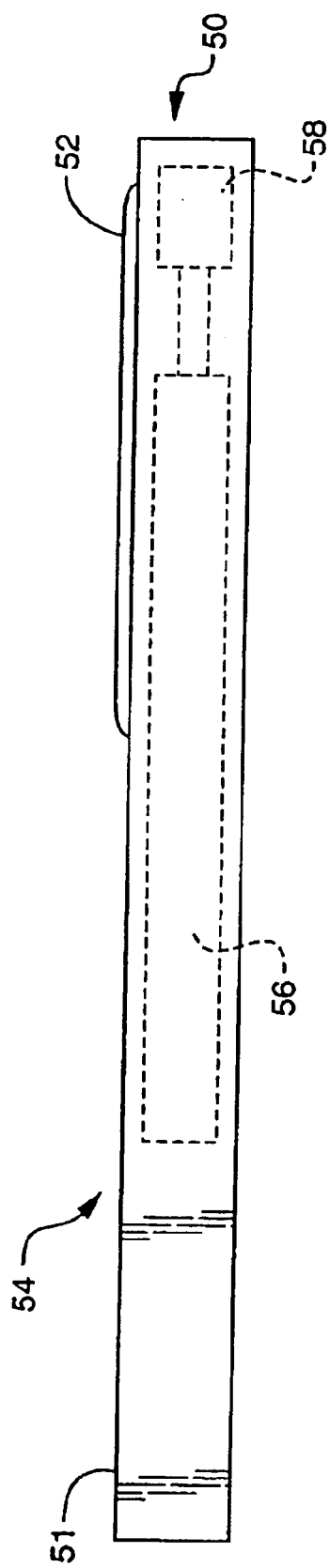
FIG. 7 is a side elevation view of the transaction tray illustrated in FIG. 6.

FIG. 7 is a side elevation view of the transaction tray 50 of FIG. 6, showing surface 51, first writing portion 54 and display screen 52. In addition, dotted line 56 may show a location of communications means disposed within tray 50 which, as indicated above, may comprise known reception and/or communications means which may be licensed from a variety of telecommunications equipment makers. Further, dotted line 58 may indicate the approximate location of an antenna or other antenna means which may be used to receive wireless communications from a remote source, and which may then forward said information to communications means 56 for processing.

Figure 8:
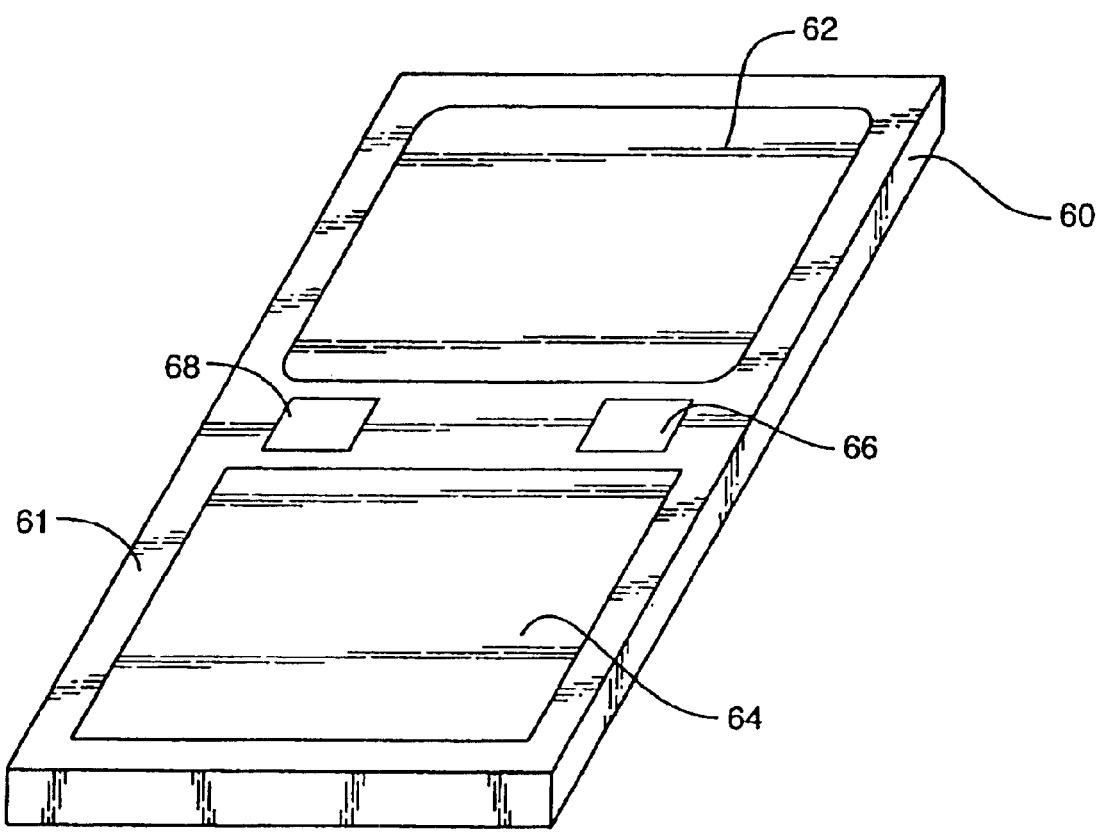
FIG. 8 is a perspective view of an alternative embodiment of a transaction tray in accordance with a further aspect of the present invention.

FIG. 8 illustrates a further embodiment of an additional aspect of the present invention wherein tray 60 comprises surface 61, first writing portion 64 and display screen 62. In addition, transaction tray is illustrated as comprising first keypad 66 and keypad 68 which may, for example, each be identified as a 'YES' and a 'NO' keypad which may enable the user to respond to choices which may be proffered to him on the display screen 62. Thus, as may be understood, a user may, upon receiving information on screen 62, make choices, selections, purchases, and/or in any other way make his choices and responses known as a result of the prompt which may appear on the display screen.

Thus, as may be understood, the transaction tray 60 as illustrated in FIG. 8 would not comprise two-way communications means, such that not only would tray 60 be able to receive, i.e. download, information from a remote source, but would also be able to transmit information back to the same or to a different remote source. Thus, as may be understood, the two-way communications means which would be incorporated in transaction tray 60 would also be purchased or licensed from telecommunications equipment manufacturers, which manufacture two-way communications means.

Figure 9:
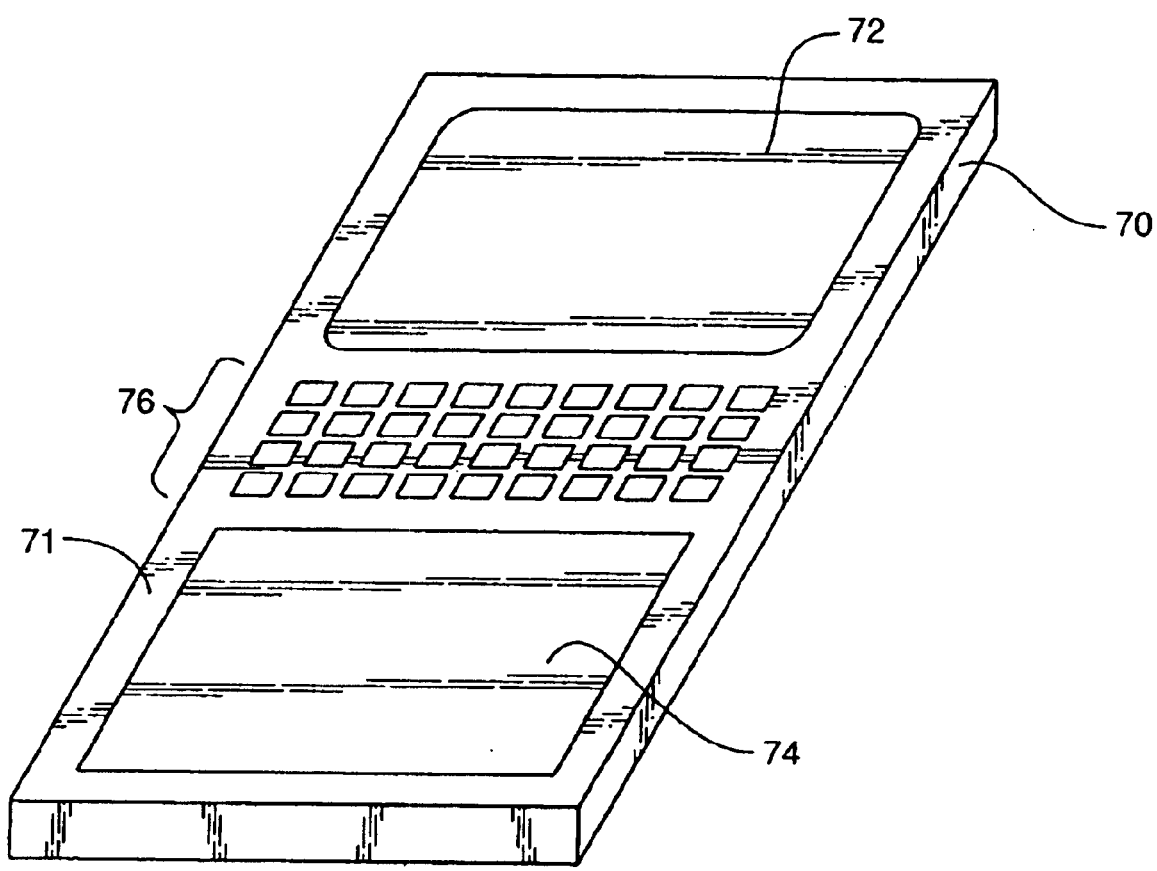
FIG. 9 is a perspective view of an alternative embodiment of a transaction tray in accordance with a further aspect of the present invention.

FIG. 9 illustrates a perspective view of an additional embodiment of a further aspect of the transaction tray 70. Transaction tray 70 comprises a surface, which surface further comprises a first writing portion 74 and a display screen 72. As illustrated, transaction tray 70 further comprises a keyboard 76 comprising a plurality of alpha numeric keypads which in the particular embodiment illustrated comprises numbers 1 through 10 and letters A through Z. Thus, in accordance with this particular embodiment, a user of a transaction tray would not only be able to make his choices known with respect to options presented to him on the display screen 72 but would also be able to send e-mail messages, and transact more fully with a remote source such as the internet and may, for example, be able to make purchases, gamble, and in any other way effect internet transactions.

Figure 10:
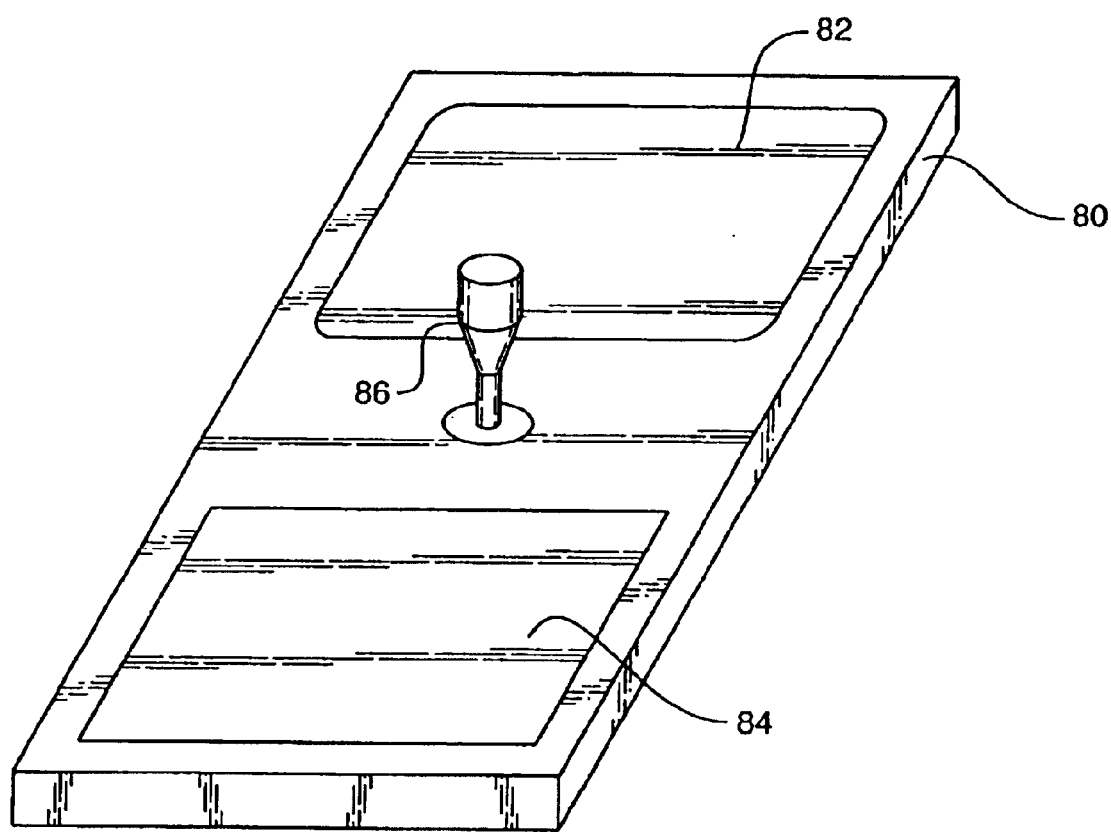
FIG. 10 is a perspective view of an alternative embodiment of a transaction tray in accordance with a further aspect of the present invention.

FIG. 10 illustrates a further embodiment of the present invention wherein transaction tray 80 comprises a first writing portion 84, display screen 82 and is further provided with a joystick 86 which may allow a user to interact with and respond to choices proffered on display screen 82.

These and other aspects of the present invention would be readily obvious to one skilled in the art to which the present invention relates. For example, even though the present invention has been described for use as a transaction tray, it may also be used as a remote receiving station for receiving, or for receiving and transmitting information through wireless communication means from a remote source, i.e. it is not necessary that it be used as transaction tray. For example, a possible use of the tray would be to simply allow a patron at an eating or other type of establishment to have portable access to the internet, for example, at his table, whether that access was through a wireless communications means or through a wired communications means. For example, a fan at a ball game may whish to have access to the internet while he is sitting in the stands. In accordance with an aspect of the present invention, the tray would allow him to do so.

I claim:

1. A transaction tray comprising a tray portion and a hinged lid portion, the tray portion having a transaction compartment and a storage compartment, lighting means associated with the transaction compartment, the lid portion having a flat outer surface and a parallel inner surface, a first transparent window in the outer surface of the lid and a second transparent window in the inner surface, a first translucent intelligence bearing substrate displayed in the first window and a second translucent intelligence bearing substrate displayed in the second window, and a lighting means between the first and second translucent substrates whereby the transaction tray will be lit by the lighting means and the translucent substrates will be displayed and backlit from both sides of the hinged lid, said transaction tray further comprising communication means for receiving information to be displayed on said translucent intelligence bearing surface, wherein said information is received by said communications means from a source remote from said apparatus.

2. A transaction tray as defined in claim 1, wherein the lighting means includes flexible electro luminescent strips.

3. The transaction tray as defined in claim 1, wherein the illumination strips are connected to an electrical circuit within the storage compartment and the current is supplied by battery means within the storage compartment and the communications means is disposed within the storage compartment.

4. The transaction tray of claim 1, wherein said communications means is a wireless communications means.

5. The transaction tray of claim 1, wherein said communications means comprises an antenna for receiving said information.

6. The apparatus of claim 1, wherein said communications means comprises a telephony communication means.

7. The transaction tray as defined in claim 1, wherein an illumination strip is provided on the sides of the recessed portion in the tray.

8. The transaction tray as defined in claim 1, wherein a first transparent film is provided in the first transparent window superimposing the first translucent intelligence bearing substrate, and a second transparent film is provided in the second window over the second translucent intelligence bearing substrate.

9. The transaction tray as claimed in claim 14 wherein said information received by said communication means from said source remote from said apparatus includes billing information.

10. The transaction tray as claimed in claim 9 wherein said communication means transmits information from said transaction tray to a second remote source.

11. The transaction tray as claimed in claim 10 wherein said information transmitted by said communication means to said second remote source from said transaction tray includes billing information.

12. The transaction tray as claimed in claim 11 wherein said transaction tray further includes an input device, said input device adapted to input data into said transaction tray, wherein said communication means transmits said data to said second remote source.

13. The transaction tray as claimed in claim 12 wherein said input device includes a keypad.

14. The transaction tray as claimed in claim 12 wherein said input device includes a credit card reader.

15. The transaction tray as claimed in claim 12 wherein said input device includes a digital image device.

16. The transaction tray as claimed in claim 1 wherein said transaction tray further includes a printer.

17. The transaction tray as claimed in claim 1 wherein said communication means includes means for providing point of purchase transactions.

18. A transaction tray comprising:

a body portion defining a cavity;

a lid portion hingedly secured to said body portion, said lid portion having an inner and outer surface having a first and a second electronic display respectively, wherein said second display is adapted to be viewed while said lid portion is in a closed position with respect to said body portion and wherein at least said first display is adapted to be viewed while said lid portion is in an open position with respect to said body portion; and a communication device, said communication device at least receiving data from a remote source to be displayed on at least one of said first and said second electronic display.

19. The transaction tray as claimed in claim 18 wherein said communication device transmits data from said transaction tray to said remote source.

20. The transaction tray as claimed in claim 19 wherein said transaction tray further includes an lighting source wherein said lighting source illuminates at least a portion of said body portion when said lid portion is in said open position.

21. The transaction tray as claimed in claim 20 wherein said lighting source further includes at least one flexible electro luminescent strip.

22. The transaction tray as claimed in claim 21 wherein said at least one flexible electro luminescent strip is disposed proximate said cavity.

23. The transaction tray as claimed in claim 18 wherein said communication device further includes a wireless communication device.

24. The transaction tray as claimed in claim 18 wherein said first and said second electronic displays are adapted to display a first and a second image, respectively.

25. A transaction try comprising:

a body portion defining a cavity;

a lid portion hingedly secured to said body portion having at least one electronic display;

an input device allowing a user to enter user-specific data relevant to a transaction; and a communication device, said communication device at least receiving data from a remote source to be displayed on said at least one electronic display, said communication device for also receiving at least said user specific data relevant to said transaction from said input device and for transmitting said user-specific data relevant to said transaction to said remote source such that said user may complete said transaction using said transaction tray.

26. The transaction tray as claimed in claim 25 wherein said lid portion includes an inner and outer surface having a first and a second electronic display respectively, wherein said second electronic display is adapted to be viewed while said lid portion is in a closed position with respect to said body portion and wherein at least said first electronic display is adapted to be viewed while said lid portion is in an open position with respect to said body portion; and wherein said communication device at least receives data from said remote source to be displayed on at least one of said first and said second electronic displays.

27. The transaction tray as claimed in claim 26 wherein said transaction tray further includes a lighting source wherein said lighting source illuminates at least a portion of said body portion when said lid portion is in said open position.

28. The transaction tray as claimed in claim 27 wherein said lighting source further includes at least one flexible electro-luminescent strip.

29. The transaction tray as claimed in claim 26 wherein said first and said second displays are adapted to display a first and a second image, respectively.

30. The transaction tray as claimed in claim 25 wherein said communication device further includes a wireless communication device.

31. The transaction tray as claimed in claim 25 wherein said transaction is selected from the group consisting of paying bills, paying a diner bill at a dinner table, purchasing stocks on-line and responding to advertising.

32. The transaction tray as claimed in claim 25 wherein said remote source includes the internet.

33. A dinner bill transaction try comprising:

a body portion defining a cavity;

a lid portion hingedly secured to said body portion having at least one electronic display;

an input device allowing a user to enter user-specific data relevant to a dinner bill transaction; and a communication device, said communication device at least receiving data from a remote source to be displayed on said at least one electronic display, said communication device for also receiving at least said user specific data relevant to said dinner bill transaction from said input device and for transmitting said user-specific data relevant to said dinner bill transaction to said remote source such that said user may pay for and complete said dinner bill transaction from said transaction tray.

* * * * *